United States Patent [19]

Yoshida

[11] 4,367,838

[45] Jan. 11, 1983

[54] METHOD OF PRODUCING CLAD STEEL ARTICLES

[75] Inventor: Toshio Yoshida, Kobe, Japan

[73] Assignee: Kawasaki Jukogyo Kabushiki Kaisha, Kobe, Japan

[21] Appl. No.: 178,347

[22] Filed: Aug. 14, 1980

[30] Foreign Application Priority Data

Sep. 20, 1979 [JP] Japan .................. 54-120127

[51] Int. Cl.³ .......................................... B23K 20/12
[52] U.S. Cl. .................................... 228/112; 228/155; 228/156; 228/158; 72/370; 72/258; 72/700
[58] Field of Search ............... 228/112, 113, 114, 155, 228/156, 158; 72/368, 370, 258, 700

[56] References Cited

U.S. PATENT DOCUMENTS

| | | | |
|---|---|---|---|
| 2,107,943 | 2/1935 | Hopkins | 72/700 X |
| 3,126,625 | 3/1964 | Laing | 228/112 |
| 3,134,278 | 5/1964 | Hollander et al. | 228/112 X |
| 3,504,425 | 4/1970 | Sutovsky et al. | 228/112 |
| 3,664,012 | 5/1972 | Wilke et al. | 72/258 X |

FOREIGN PATENT DOCUMENTS

| | | | |
|---|---|---|---|
| 49-6026 | 2/1974 | Japan | 228/114 |
| 607205 | 8/1948 | United Kingdom | 228/155 |
| 1234586 | 6/1971 | United Kingdom | |

*Primary Examiner*—Kenneth J. Ramsey
*Attorney, Agent, or Firm*—Martin Smolowitz

[57] ABSTRACT

An inner stainless-steel tube having an outer frustoconical faying surface is fitted into an outer carbon-steel tube having a matching inner frustoconical faying surface, and these tubes are friction welded over their entire faying surfaces by pressing the tubes together in their axial direction to obtain a high contact pressure due to a wedge action and, at the same time, imparting rotation thereto relative to each other thereby to obtain an integrally bonded, laminated, tubular blank, which is then extended by a suitable process such as rolling into a clad steel tube. The tubular blank can also be slit in its axial direction and flattened into a laminated flat blank, which can be rolled into a clad steel plate. The inner tube may be replaced by a solid core metal. In this case, an integrally bonded blank made up of the inner core metal and the outer tube is extended into a clad steel tube or into a clad steel shape.

6 Claims, 14 Drawing Figures

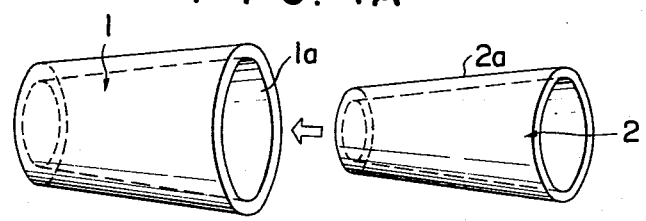
FIG. IA
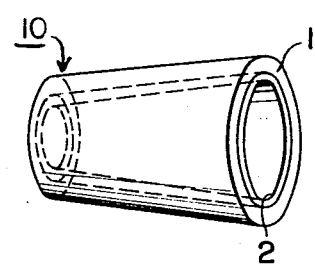
FIG. IB
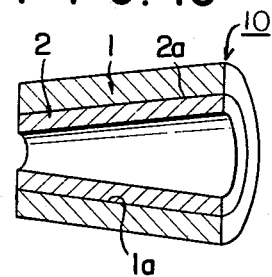
FIG. IC
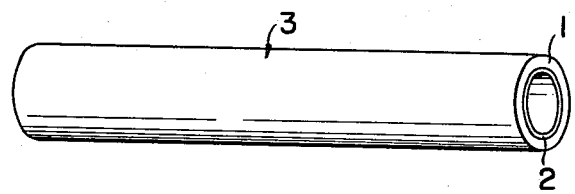
FIG. ID

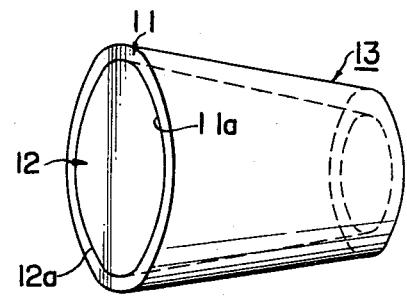
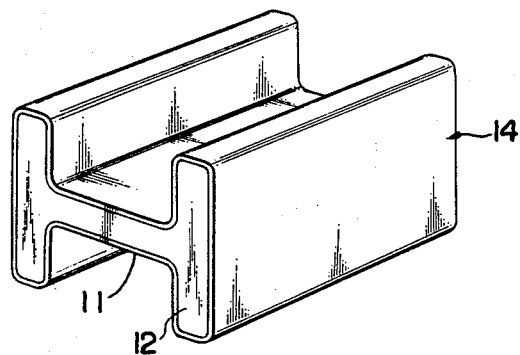
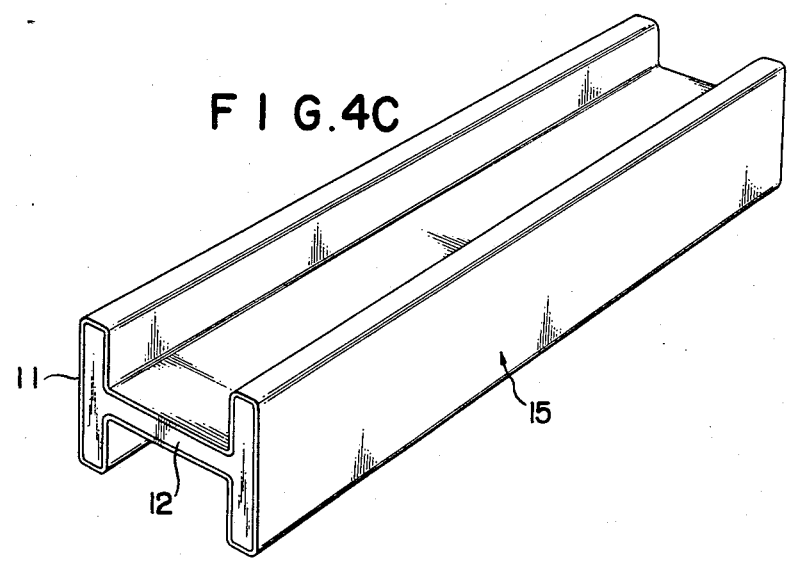

METHOD OF PRODUCING CLAD STEEL ARTICLES

BACKGROUND OF THE INVENTION

This invention relates to a method of producing various clad steel articles.

Steel materials such as steel tubes, steel plates, and steel shapes are being used widely and in great quantities in an extensive range of industrial fields for structures such as bridges and buildings, of course, and also for oil-well pipes, various piping and pipe-lines, heat exchangers, and many other items of equipment. These steel materials are required to have not only mechanical strength sufficient for their uses but also properties such as heat resistance, corrosion resistance, and abrasive wear resistance, which are important for durability of the steel materials.

While the physical chemical material conditions of these steel materials with respect to their material properties, thickness, shape, etc., are determined from the strength requirement as a first consideration, the conditions for the requirement for the above mentioned durability do not coincide with those for strength in many instances. For example, a steel of high tensile strength does not necessarily have excellent corrosion resistance.

Accordingly, it has been the practice to resort to measures such as cladding, simple lining, and coating with appropriate metal materials, single non-metallic materials, mixtures thereof, and the like for protecting the steel materials.

Particularly in recent years there is a trend toward the building of larger and more complicated structures such as plants. This trend has given rise to great increases in not only initial construction costs but also in running cost relating to operation and maintenance for such measures as corrosion proofing, whereby there is an ever increasing need for steel materials having ample corrosion resistance together with strength.

For example, cases wherein steels of high tensile strength are used as reinforcing materials are increasing. However, high-tensile-strength steels, contrary to their excellent strength characteristic, are not necessarily fully satisfactory on the point of corrosion resistance. Accordingly, as a countermeasure, it is possible to use a stainless steel which has excellent corrosion resistance. A stainless steel, however, is somewhat inferior in strength, whereby it has the demerit of giving rise to thick and heavy construction and high costs.

Accordingly, there has been proposed a technique wherein, with the aim of utilizing the advantages of the two steels thereby to make up for their deficiencies, a high-tensile-strength steel is used as the base metal, and a stainless steel is caused to adhere intimately to the base metal thereby to impart their respective strength and corrosion resistance characteristics to the combination. In this case, it is highly desirable on the points of economy and strength of materials that the expensive bonded stainless steel be thin and that the strength of the bond between the metals be high.

As a technique for bonding intimately to one metal material a metal of a different kind, the cladding method is commonly used. For carrying out this cladding, there are, for example, the explosive-cladding or percussion-cladding method, the weld-overlaying method, and the hot-rolling method.

The explosive-cladding method utilizes the application of instantaneous high pressure accompanying the explosion of an explosive. This method requires expensive equipment including safety measures and means, whereby it entails high initial costs, high running costs, and complicated operation and is not easily practiced.

The weld-overlaying method comprises welding and adding a molten padding of a stainless-steel filler material on the surface of a base material of carbon steel. This method is accompanied by the problems such as welding strain imparted by the welding heat during the welding, the long time required for the welding work, low work efficiency, and limitation of the selectable filler materials of good weldability.

The method of producing electric-resistance welded steel pipes from clad steel strip formed into tubes, which is similar to this, also requires much labor and has other drawbacks such as precipitation of carbides due to heat of welding and the necessity of homogenizing the welded structure by heat treatment after welding.

The hot-rolling method is a historically old technique in which a metal material is placed intimately against a metal material of another kind after their contact faces have been cleansed, and then the two materials are hot rolled, in which process step, fresh surfaces are generated on the contact faces and the two materials are roll welded while they are still at a high temperature. Accordingly, the provision beforehand of clean contact faces is an indispensable condition. Therefore, in order to satisfy this condition, the presence of residual air in the contact faces and the formation of oxide films thereon must be absolutely avoided, whereby there are cases wherein a measure such as preserving the contact faces in a vacuum becomes necessary. Furthermore, this method requires a large reduction ratio and a high rolling temperature, for which various measures have heretofore been resorted to, but the means have been disadvantageously complicated and inefficient in many instances.

For the above mentioned bonding, the friction welding method, per se, is a historically known method. In this method, there is almost no generation of heat from parts other than the faces being bonded, and plastic flow occurs at the bond faces. Accordingly, not only is the energy efficiency high, but there are other excellent merits such as the attainment of maximum bond strength through solid-state bonding.

Furthermore, this bonding method affords a range of selection of combinations of bondable metals of different kinds which is very much broader than the range afforded by other bonding methods. Moreover, because of the solid-state bonding based on plastic flow as mentioned above, no metal compounds are formed. Further, there is little welding deformation, and high dimensional precision is afforded, whereby this method can be said to be highly suitable for clad welding.

Additional merits of this method are that welding rods and a welding flux are not required, and that a pretreatment of the faying faces to be bonded is unnecessary, whereby economy in materials, decrease in labor, short welding time, high work efficiency automation of the bonding process, high reliability, and other advantageous features are afforded. It is evident, therefore, that this friction welding method is optimally suited for the production of clad steel materials.

SUMMARY OF THE INVENTION

It is an object of this invention to overcome the problems encountered in the production of clad steel articles according to the prior art by providing a clad steel article producing method based on a technique researched and developed on the premise that the above mentioned friction welding is optimal for the production of clad steel articles.

According to this invention, briefly summarized, there is provided a method of producing clad steel articles which comprises providing a steel material and a dissimilar metal material with respective faying surfaces of frustoconical shape to be mutually mated, fitting together the materials in mated state, bonding the materials by friction welding at the faying surfaces by pressing together the materials in their axial direction and, at the same time, causing the materials to undergo relative rotation thereby to produce a bonded blank, and extending the blank into a clad steel tube, plate, shape, or other article by a process such as hot rolling, cold rolling, or forging.

A unique feature of this invention is that the entire faying surfaces to be bonded of the above mentioned steel material and the dissimilar metal material are formed beforehand into matching frustoconical surfaces. Then, in the bonding process, compressive force is applied to two materials in their axial direction thereby to utilize the resulting wedge action to press the same tightly together, and, at the same time, mutually relative rotation is imparted to the two materials. As a result of the frictional rubbing action, heat is generated to place the faying surfaces in a high-temperature state, whereby friction welding is accomplished uniformly and reliably at all parts of the faying surfaces, and the two materials are strongly bonded into an integral blank. The use of the matching frustoconical surfaces for the friction welding has proved to be very effective for performing reliable relative rotation of the materials to be bonded and for attaining uniform generation of heat therebetween.

The nature, utility, and further features of this invention will be apparent from the following detailed description with respect to preferred embodiments of the invention when read in conjunction with the accompanying drawings briefly described below.

BRIEF DESCRIPTION OF THE DRAWINGS

In the drawings:

FIGS. 1A through 1D are perspective views for a description of a process of producing a double-wall tube, the process constituting one embodiment of this invention;

FIGS. 4A, 4B, and 4C are perspective views for a description of a further embodiment of the invention by which a clad steel shape is produced.

DETAIL DESCRIPTION OF THE INVENTION

Figure 2A:
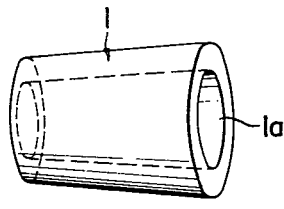
FIGS. 2A and 2B are respectively a perspective view and a perspective view with one half cut away of a blank prepared for producing a double-wall tube by a process constituting another embodiment of the invention.

The mode of practice illustrated in FIGS. 1A through 1D is an example of a process of producing a clad steel tube, or double-wall tube, according to this invention. In this process, a clad steel tube is formed from an outer tube 1 and an inner tube 2. The outer tube 1 is a carbon-steel tube of frustoconical shape and has an inner wall surface 1a prepared to be a frustoconical faying surface to be bonded over its entire area. The inner tube 2 is a stainless-steel tube also of frustoconical shape and has an outer surface 2a prepared to be a frustoconical faying surface over its entire area to fit in the outer tube 1 against the inner wall surface 1a thereof. The faying surfaces 1a and 2a are suitably prepared by machine finishing.

As indicated in FIG. 1A, the inner tube 2 is fitted to a specific extent in the outer tube 1 to form a laminated structure. Then, by means of a rotary pressure-welding apparatus (not shown), a compressive force is applied to this laminated structure in the axial direction thereof to impart a setting surface pressure to the entire faying surfaces 1a and 2a by a wedge effect, and, by suitable means, the two tubes 1 and 2 are caused to rotate relative to each other. The resulting friction between the two tubes 1 and 2 generates frictional heat, whereby the faying surfaces 1a and 2b to be bonded are heated to a high temperature.

Then, at the instant when this temperature reaches a value which is somewhat lower than the melting points of the two tubes 1 and 2, a compressive force is further applied to the two tubes, whereupon, as a result of the above mentioned wedge effect, the two faying surfaces 1a and 2a are subjected instantaneously to pressure welding. As a consequence, plastic flow occurs over the entire faying surfaces, and a strong, integral blank 10 as shown in FIGS. 1B and 1C is formed. This integral blank is then removed from the rotary pressure-welding apparatus and subjected to a known steel tube extending process step such as hot or cold rolling, drawing, or extruding, whereupon a clad steel material 3 in the form of a clad double-wall tube as shown in FIG. 1D is obtained.

In the above described mode of production, by making the cross sectional areas of the carbon-steel tube 1 and the stainless-steel tube 2 in their original frustoconical states constant in their axial direction from one end to the other, it becomes possible with high precision to obtain a clad steel tube 3 after rolling of uniform wall thickness.

In another example of producing a clad double-wall tube according to this invention as illustrated in FIGS. 2A through 2E, a frustoconical outer tube 1 with an inner wall surface 1a, which is similar to the outer tube 1 in the preceding example, is used. Into this outer tube 1 is fitted a solid frustoconical core metal 4 of stainless steel, the outer surface 4a of which is machine finished to fit the inner wall surface 1a of the outer tube 1. Then, similarly as in the preceding embodiment of the invention, by means of a rotary pressure-welding apparatus, an integral blank 5 of billet-like shape is formed. In this blank 5, the bonding surfaces 1a and 4a are intimately welded together by plastic flow bonding as described with respect to the preceding example. For this reason, the bond is very strong and is not affected in any manner in the subsequent step of rolling or other mode of extension.

Figure 2B:
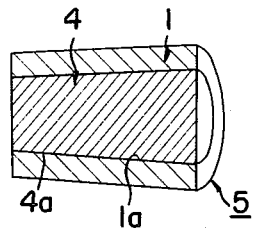
Figure 2C:
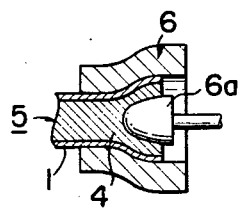
FIGS. 2C, 2D, and 2E are side views in longitudinal section for a description of the process of forming a double-wall tube from the blank shown in FIGS. 2A and 2B.
Figure 2D:
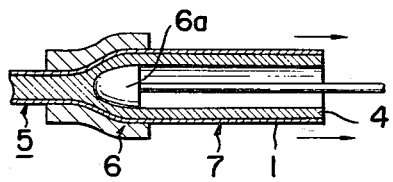
Figure 2E:
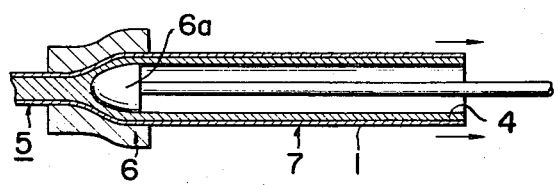

The blank 5 thus integrally bonded, which is shown with one half thereof cut off in FIG. 2B, is then placed in a suitable apparatus having, essentially, a die 6 and a co-acting mandrel 6a and is subject to cold extruding as indicated in FIGS. 2C, 2D, and 2E, whereupon a double-wall, clad steel material 7 in the form of a tube is obtained. It will be noted that as the extrusion operation proceeds in the direction of the arrows the tube 7 is formed.

This method is not limited, of course, to the production of only double-wall tubes but is applicable with equal effectiveness to the production of laminated multiple-wall tubes such as triple-wall and quadruple-wall tubes.

The mode of producing the above described clad steel material 7 is not limited to that of the above described example of practice, of course, various other modes such as cold drawing being also possible to produce a bond of high strength between the bonding surfaces 1a and 4a, which is not damaged in any manner in a subsequent step.

By causing the ratio between the cross-sectional areas of the original carbon-steel tube 1 and the stainless-steel core metal 4 to be constant at all cross section in the axial direction, the wall thickness of the clad steel tube 7 after rolling can be made uniform with high precision.

Figure 3B:
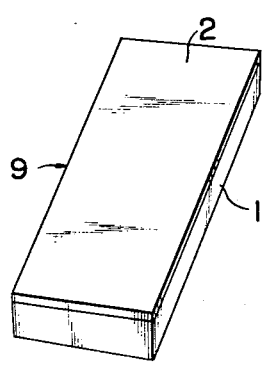
FIGS. 3A and 3B are perspective views for a description of a process of producing a laminated plate, the process constituting still another embodiment of the invention.
Figure 3A:
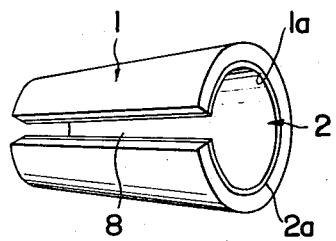

In still another embodiment of this invention as illustrated in FIGS. 3A and 3B, the method is modified to produce a clad steel material of plate form. A laminated tubular blank of frustoconical shape as shown in FIG. 1B, consisting of a carbon-steel outer tube 1 and a stainless-steel inner tube 2 bonded by friction welding at their faying surfaces 1a and 2a as described with respect to the first embodiment of the invention, is cut through its wall to form a slit 8 in the axial direction as shown in FIG. 3A.

Then, by an appropriate known method such as hot rolling or cold rolling, this blank is extended into a clad steel material of the shape of a laminated flat plate 9 as shown in FIG. 3B. Then by a known steel plate rolling process, the flat plate 9 is extended into a clad steel plate of the desired thickness. The bond between the faying surfaces 1a and 2a, of course, is not adversely affected in any manner by the rolling process in the instant example.

In a further embodiment of this invention as illustrated in FIGS. 4A, 4B, and 4C, the method of this invention is applied to produce a clad steel shape. By a process which is substantially the same as that in the aforedescribed second embodiment of the invention, a frustoconical blank 13, as shown in FIG. 4A is formed by subjecting a frustoconical core metal 12 of carbon steel and a frustoconical outer tube 11 of stainless steel to rotary compressive action by means of a rotary pressure-welding apparatus as mentioned hereinbefore thereby to bond by friction welding the faying surfaces 12a and 11a of the core metal 12 and the outer tube 11.

In the instant example of practice, also, plastic-flow bonding due to the heat generated at only the bonding surfaces 11a and 12a is attained, whereby the two metal elements are bonded strongly into an integral blank 13.

The blank 13 is then taken out of the rotary pressure-welding apparatus and, by means of an appropriate forging apparatus, is formed into a preformed billet 14 of H-shaped cross section as shown in FIG. 4B. This preformed billet 14 is further subjected to hot rolling in a known H-beam rolling apparatus and thus formed into a clad-steel H-beam 15 as shown in FIG. 4C as a final product.

By the above described process, a very strong bond is established by the plastic-flow bonding between the carbon-steel core 12 and the stainless-steel cladding 11, whereby there is little possibility of breakage or division.

It will be apparent that, while the instant embodiment of the invention has been described above with respect to a clad steel H-beam, the method can be applied to the production of other clad steel shapes such as angles, I-beams, and T-beams. The volume of production of such clad-steel shapes is not very large at present, but it is expected to grow considerably hereafter because of the strength, corrosion resistance, economy, and other advantageous features of these products.

The modes of practice of this invention are not limited to those of the above described examples applied to the production of clad steel tubes, clad steel plates, and clad steel shapes but can be applied to the production of various other clad steel materials such as beams, bars, and ingots. The production process, can be carried out either by hot rolling or by cold rolling, it being possible to interpose a forging step as an intermediate step or in a preceding stage.

In the design of a clad steel material, the thickness of the cladding metal is selected, with consideration of the economy, strength, and corrosion resistance of the product, at a value which will make possible friction welding in the production process thereof.

The cladding metal with respect to carbon steel is not limited to stainless steel. Other ferrous materials such as mild steel, high tensile strength steels, very soft steels, high-speed steels, and abrasion-resistant steels, of course, can be used. In addition, non-ferrous metals such as Ti, Nb, Mo, Zr, Al, Cr, and Cu can be used provided that they can be subjected to friction welding in combination with the base metal. These dissimilar metals can be used to form claddings of two or more layers.

Furthermore, in the design of the products, the materials, their material properties and qualities, their shapes, and combinations can be selected with consideration of the required stength, heat resistance, corrosion resistance, and wear resistance and the object of the use of the products.

By the practice of this invention as described above, heat is not generated at parts other than the faying surfaces between the base steel material and the dissimilar metal material, and a strong solid-state bond through plastic flow is obtained by effective use of friction welding. Thus this strong bond is obtained by only friction welding whereby shortening of the process, reduction in cost, decreasing of the space occupied by equipment, and elevation of work efficiency are afforded.

In carrying out the above described bonding processes by friction welding, conditions such as fine finishing of the faying surfaces, maintaining of cleanliness such as maintenance of a vacuum up to the rolling, and maintaining of a high temperature, which are considered necessary for the conventional bonding by forging, need not be met. On this point, also, there are afforded merits such as simplification of the process steps, increase in the work efficiency, and improvement of the accuracy.

Furthermore, since in the practice of this invention, the friction welding is carried out over the entire faying surfaces by relative rotation therebetween, it is possible to reduce the thickness of the dissimilar metal at the stage of the friction welding. Moreover, since the bond between the plurality of metals is very strong, there is no breakage or separation of the bonded faying surfaces in the rolling process, whereby the thickness of the cladding metal of the product can be made as small as required and still provide ample heat resistance, wear resistance, and corrosion resistance.

The utilization of a wedge effect in the practice of this invention results in a bond between the blank metals which is much stronger than that produced by the conventional bonding by forging. Yet, in spite of this, the heat input per unit faying surface area is markedly less than that in a conventional bonding method. For this reason, the range of combinations of dissimilar metals which can be bonded is broadened even more, and not only stainless steel but almost any kind of metal can be used for cladding. Thus, this range of possible material combinations greatly exceeds those of other known methods such as the rolling method and the weld-overlaying method.

Because of the strong bond obtainable by the method of this invention, ordinary rolling, that is, either hot rolling or cold rolling, can be used after the bonding, and there is almost no limit to the reduction ratio. Therefore, clad steel products of high strength, particularly at their bonded parts, can be produced by the method of this invention.

What is claimed is:

1. An improved method of producing clad steel articles which comprises placing a dissimilar metal material in a laminated state against a steel material, having mutual contact along respective frustoconical faying surfaces, and friction welding the metal materials by relative rotation at their faying surfaces to cause bonding of said metal materials together, the improvement comprising the steps of: forming one of the metal materials to be friction welded as an outer tube, having an inner wall surface finished to be the frustoconical faying surface thereof, forming the other metal material as an inner tube having an outer surface finished to mate with said frustoconical faying surface, producing by said friction welding a bonded metal blank an subjecting said metal blank to plastic working to produce a clad steel article.

2. An improved method of producing clad steel articles which comprises, placing a dissimilar metal material in a laminated state against a steel material with mutual contact along respective frustoconical faying surfaces, and friction welding the metal materials by relative rotation at their faying surfaces to bond said materials together, the improvement comprising the steps of: forming one of the metal materials to be friction welded to the other in the form of an outer tube having an inner wall surface finished as the frusto conical faying surface thereof, forming the other metal material as a solid core having an outer surface finished to mate with said frustoconical faying surface, and producing by friction welding, a bonded metal blank and subjecting it to plastic working for producing a clad steel article.

3. An improved method according to claim 1, comprising the steps of: forming the outer tube of the steel material, forming the inner tube of the dissimilar metal material and forming said bonded metal blank into an internally clad steel tube by the plastic working.

4. An improved method according to claim 2, comprising the steps of: forming the outer tube of the steel material, forming the solid core of the dissimilar metal material, and plastically extending the bonded metal blank by a die and a coacting mandrel into an internally clad steel tube.

5. An improved method according to either of claims 3 or 4, comprising the steps of: slitting the internally clad steel tube through its wall in the axial direction and opening same into a flat blank, and plastically extending said blank into a flat laminated plate.

6. An improved method according to claim 2, comprising the steps of: forming the outer tube of the dissimilar metal material, forming the solid core of the steel material and plastically shaping and extending the bonded metal blank into a clad steel shape.

* * * * *